United States Patent
Moran et al.

(10) Patent No.: US 11,954,511 B2
(45) Date of Patent: Apr. 9, 2024

(54) AUTOMATED STORAGE SYSTEM PERFORMANCE VALIDATION

(71) Applicant: EMC IP Holding Company LLC, Hopkinton, MA (US)

(72) Inventors: John Moran, Mebane, NC (US); Christopher Trudel, Florence, TX (US); Anurag Sharma, Cedar Park, TX (US)

(73) Assignee: EMC IP Holding Company LLC, Hopkinton, MA (US)

(*) Notice: Subject to any disclaimer, the term of this patent is extended or adjusted under 35 U.S.C. 154(b) by 468 days.

(21) Appl. No.: 17/232,878

(22) Filed: Apr. 16, 2021

(65) Prior Publication Data
US 2022/0334860 A1    Oct. 20, 2022

(51) Int. Cl.
*G06F 9/455* (2018.01)
*G06F 11/30* (2006.01)
*G06F 11/34* (2006.01)

(52) U.S. Cl.
CPC ...... *G06F 9/45558* (2013.01); *G06F 11/3034* (2013.01); *G06F 11/3409* (2013.01); *G06F 11/3428* (2013.01)

(58) Field of Classification Search
USPC ...................................................... 702/186
See application file for complete search history.

(56) References Cited

U.S. PATENT DOCUMENTS

| | | | |
|---|---|---|---|
| 9,368,147 B2 | 6/2016 | Kim et al. | |
| 10,303,377 B2 | 5/2019 | Kim et al. | |
| 10,496,531 B1* | 12/2019 | Hickey | G06F 9/45558 |
| 2004/0172220 A1* | 9/2004 | Prekeges | G06F 11/3409 |
| | | | 714/E11.197 |
| 2015/0286409 A1 | 10/2015 | Chandra et al. | |
| 2017/0169059 A1* | 6/2017 | Horowitz | G06F 16/211 |
| 2017/0322827 A1* | 11/2017 | Little | G06F 3/0665 |
| 2020/0174816 A1* | 6/2020 | Ramesh | G06F 9/45558 |

* cited by examiner

*Primary Examiner* — Paul D Lee
(74) *Attorney, Agent, or Firm* — Ryan, Mason & Lewis, LLP

(57) ABSTRACT

Methods, apparatus, and processor-readable storage media for automated storage system performance validation are provided herein. An example computer-implemented method includes obtaining user input pertaining to performance testing associated with one or more storage systems deployed in at least one user environment; generating, based at least in part on the obtained user input, a storage system performance test deployment environment comprising at least one controller and at least one data collection mechanism; executing, using the storage system performance test deployment environment, at least one performance test on at least a portion of the one or more storage systems deployed in the at least one user environment; and performing one or more automated actions based at least in part on results from the at least one executed performance test.

20 Claims, 8 Drawing Sheets

```
- name: Deploy Test Network
  # Private network for test communication.
  hosts: mgmt_hosts, systems_under_test
  tasks:
    - create_vlan:
        name: {{ test_vlan_id }}

- name: Deploy Test Controller
  # Controller includes DB for the workers to report, and any data collection.
  hosts: mgmt_hosts
  tasks:
    - deploy_controller_vm:
        name: {{ controller_vm.name }}
        ip: {{ controller_vm.ip }}

- name: Deploy Test Worker
  hosts: systems_under_test
  tasks:
    - deploy_worker:
        name: {{ ... }}
        ip: {{ ... }}
        controller: {{ controller_vm.ip }}
    - create_test_area:
        worker: {{ ... }}

- name: Cleanup Test Worker
  hosts: systems_under_test
  tasks:
    - cleanup_test_area:
        worker: {{ ... }}
    - cleanup_worker:
        name: {{ ... }}

- name: Cleanup Test Controller
  hosts: mgmt_hosts
  tasks:
    - archive_results:
        target: {{ archive_target }}
    - cleanup_controller:
        name: {{ controller_vm.name }}
```

```
<DataCollection>
    FlexOS.system_iops
    FlexOS.system_bandwidth
    VCSA.IOPS[datastore]
    VCSA.Bandwidth[datastore]
</DataCollection>
<PerfTestDefinition>
    serial:
        # Run a series of IO Tests
        fio --filename=... (Truncated for Example)
        fio --filename=... (Truncated for Example)
    parallel:
        # Run network bandwidth tests between hosts
        foreach host in [testhosts]
            iperf -s
        foreach host in [testhosts]
            iperf -c testhosts.host+1
</PerfTestDefinition>
```

AUTOMATED STORAGE SYSTEM PERFORMANCE VALIDATION

FIELD

The field relates generally to information processing systems, and more particularly to storage in such systems.

BACKGROUND

Users often want to validate that the performance of a storage system meets one or more expectations as part of, for example, a hand-off process from a storage system provider to a customer or other user. Conventional storage management approaches include performance monitoring and workload generation, but such approaches fail to allow user-specific workload definition, and the approaches typically run as third party tools on storage systems in production. Accordingly, such conventional approaches are time-consuming and resource-intensive due to the complexity of many storage systems and the variable number of interacting systems, and error-prone due to the inability to customize workloads to user needs.

SUMMARY

Illustrative embodiments of the disclosure provide techniques for automated storage system performance validation. An exemplary computer-implemented method includes obtaining user input pertaining to performance testing associated with one or more storage systems deployed in at least one user environment, and generating, based at least in part on the obtained user input, a storage system performance test deployment environment including at least one controller and at least one data collection mechanism. The method also includes executing, using the storage system performance test deployment environment, at least one performance test on at least a portion of the one or more storage systems deployed in the at least one user environment, and performing one or more automated actions based at least in part on results from the at least one executed performance test.

Illustrative embodiments can provide significant advantages relative to conventional storage management approaches. For example, problems associated with time-consuming, resource-intensive, and error-prone techniques are overcome in one or more embodiments through automatically carrying out user-defined performance testing on one or more storage systems in a user environment.

These and other illustrative embodiments described herein include, without limitation, methods, apparatus, systems, and computer program products comprising processor-readable storage media.

BRIEF DESCRIPTION OF THE DRAWINGS

FIG. 4 shows an example code snippet for implementing instructions to deploy a performance test in an illustrative embodiment.

FIG. 5 shows an example code snippet for implementing instructions to run a performance test on a given environment in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
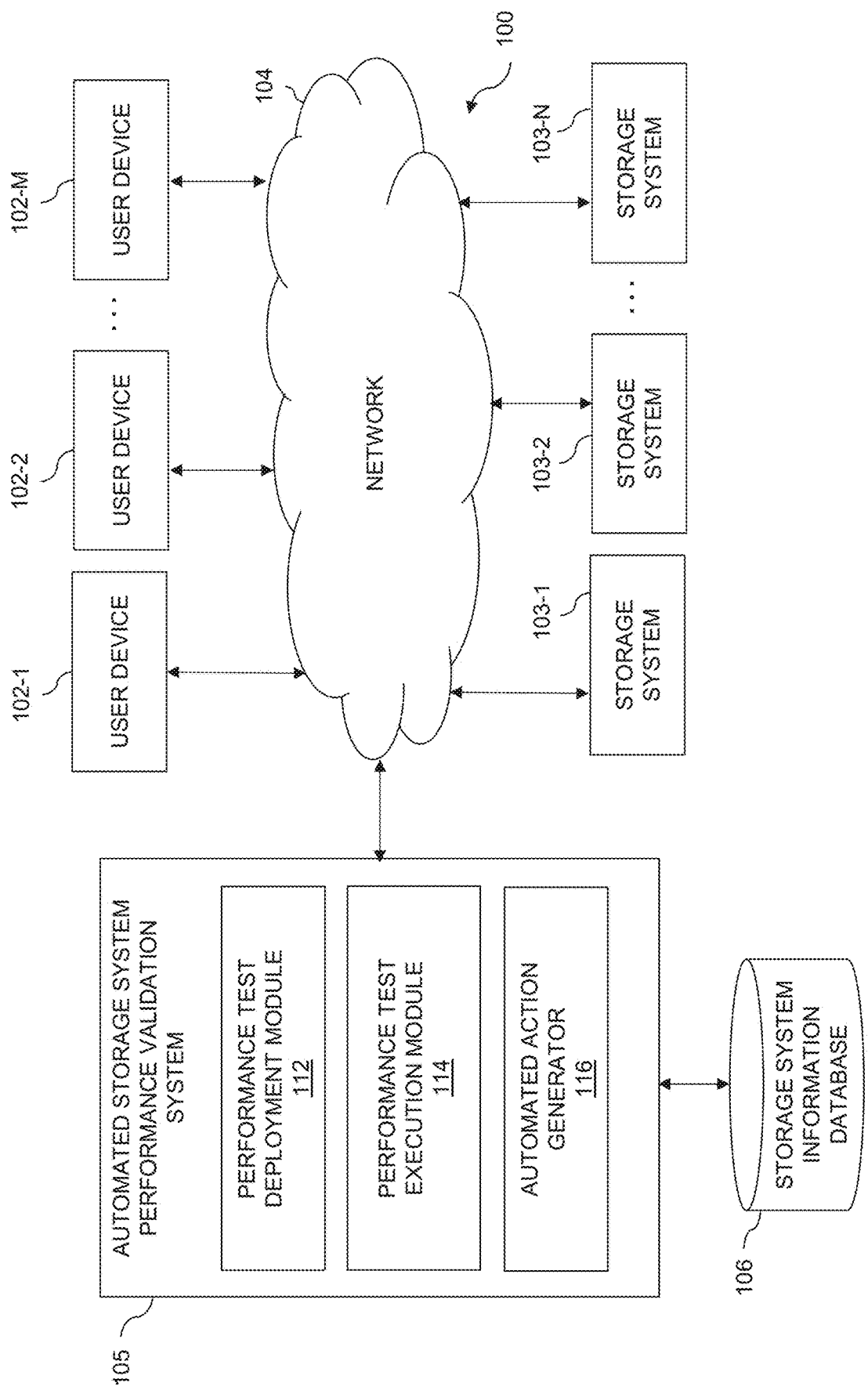
FIG. 1 shows an information processing system configured for automated storage system performance validation in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102, and a plurality of storage systems 103-1, 103-2, . . . 103-N, collectively referred to herein as storage systems 103. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated storage system performance validation system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The storage systems 103 can include, for example, software-defined storage systems and/or other forms of storage systems, and may comprise, for example, storage objects such as pools, file systems, logical storage volumes (e.g., logical units or LUNs), etc. The storage systems 103 (e.g., Storage-as-a-Service (STaaS) systems) in some embodiments comprise respective storage systems associated with a particular company, organization or other enterprise.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated storage system performance validation system 105 can have an associated storage system information database 106 configured to store data pertaining to storage systems 103 and/or one or more storage objects thereof, which comprise, for example, configuration data, performance-related data, etc.

The storage system information database 106 in the present embodiment is implemented using one or more storage systems associated with automated storage system performance validation system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated storage system performance validation system 105 can be one or more input-output devices, which illustratively comprise keyboards, displays or other types of input-output devices in any combination. Such input-output devices can be used, for example, to support one or more user interfaces to automated storage system performance validation system 105, as well as to support communication between automated storage system performance validation system 105 and other related systems and devices not explicitly shown.

Additionally, automated storage system performance validation system 105 in the FIG. 1 embodiment is assumed to be implemented using at least one processing device. Each such processing device generally comprises at least one processor and an associated memory, and implements one or more functional modules for controlling certain features of automated storage system performance validation system 105.

More particularly, automated storage system performance validation system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs. One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated storage system performance validation system 105 to communicate over the network 104 with the user devices 102 and/or storage systems 103, and illustratively comprises one or more conventional transceivers.

The automated storage system performance validation system 105 further comprises a performance test deployment module 112, a performance test execution module 114, and an automated action generator 116.

It is to be appreciated that this particular arrangement of elements 112, 114 and 116 illustrated in automated storage system performance validation system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for automated storage system performance validation involving storage systems 103 and user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated storage system performance validation system 105 and storage system information database 106 can be implemented in at least one of the storage systems 103 and/or in an associated management server or set of servers.

An exemplary process utilizing elements 112, 114 and 116 of an example automated storage system performance validation system 105 in computer network 100 will be described in more detail with reference to the flow diagram of FIG. 6.

Accordingly, at least one embodiment includes automated storage system performance validation. As detailed herein, such an embodiment can include enabling explicit validation of one or more claims on at least one storage system that is installed at a user site. One or more embodiments include providing at least one storage system performance benchmark, which can in part be user-defined, as part of a hand-off process.

By way of example, in various sales and deployment processes, a customer or other user typically purchases a storage system with the understanding that the system can perform a set of functions and meet some set of performance goals in connection with those functions. As noted herein, the deployment of the storage system can be complex, often involving engineers from multiple groups and/or enterprises collaborating toward that goal. The final activities of such approaches generally involve showing one or more key individuals (e.g., representatives of the customer, typically including those people responsible for ongoing operations of the system) how the system works and/or providing proof that the deployed system meets the stated goals along with passwords used at setup, key documentation, etc. The storage system, up to this point, is typically under the control of the teams performing these setup tasks; after this point, the system is typically put under the control of the team that will be running the system on the customer environment. This transition to customer-side control is referred to herein as a hand-off.

Accordingly, at least one embodiment can include validating that the storage system not only functions, but delivers at least one expected level of performance given one or more storage system constraints. Constraints, by way merely of example, may include limitations and/or mandates such as the system should be able to achieve 100 k input-output operations per second (IOPS) with a mean response time of less than 10 milliseconds (ms), the system should be able to maintain performance to within 80% of the target level while undergoing maintenance, etc.

As also described herein, one or more embodiments can be implemented as a deployable service based on one or more templates, executed on-demand and subsequently de-provisioned to provide the user the full capabilities of the user's system, and/or executed on-demand and subsequently maintained for ensuing test runs and system monitoring. In such embodiments, performance validation results can be archived for later comparison and/or analysis. For example, performance validation results can be used for troubleshooting a deployment prior to hand-off (increasing user confidence), an archived benchmark can be used as a future comparison point to show one or more changes in storage system behavior, and/or performance validation results can be used to generate a new user-defined test specification and/or modify an existing user-defined test specification.

Figure 2:
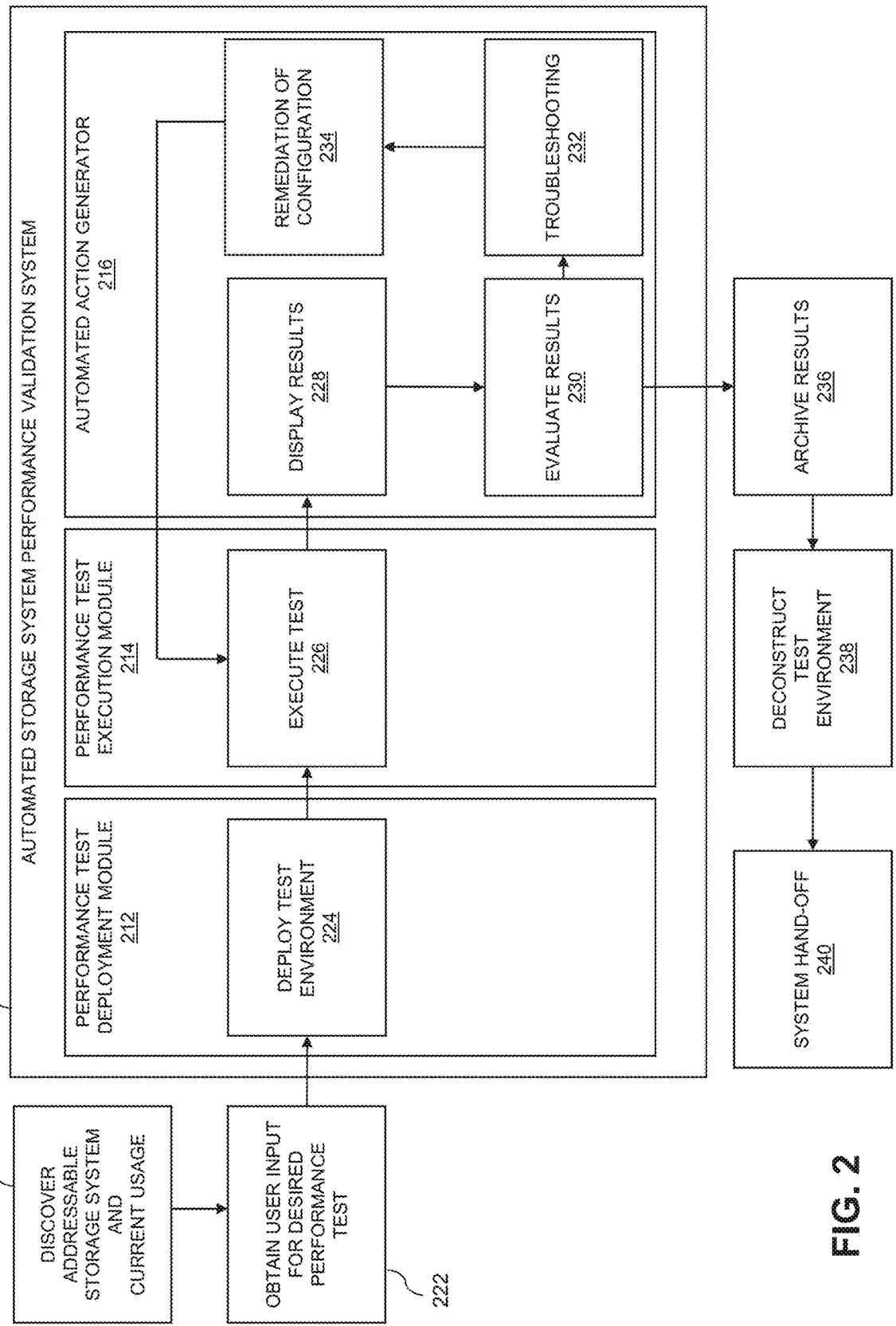
FIG. 2 shows an example workflow in an illustrative embodiment.
Figure 3:
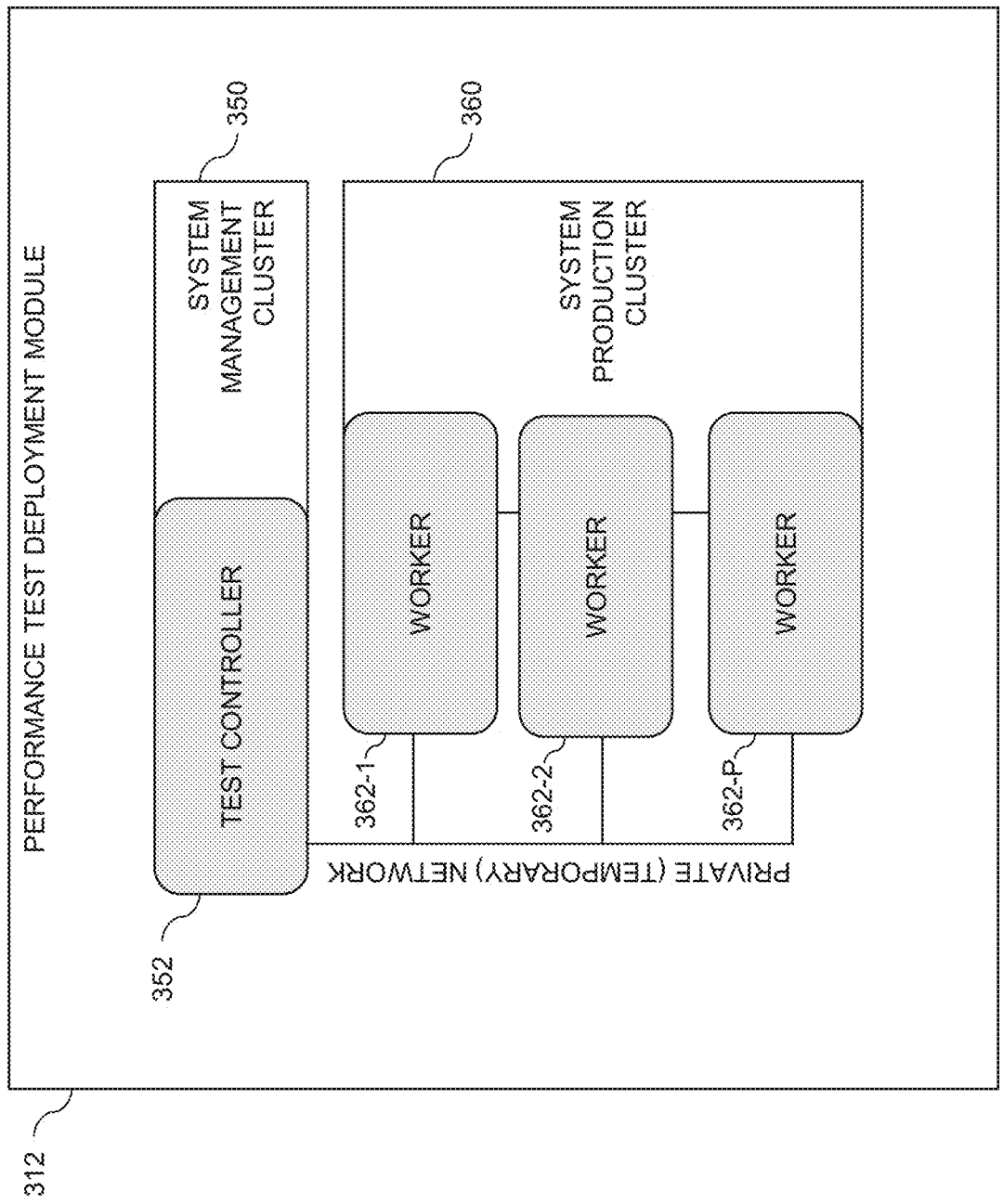
FIG. 3 shows components of an example performance test deployment module in an illustrative embodiment.

FIG. 2 shows an example workflow in an illustrative embodiment, in connection with automated storage system performance validation system 205, which includes performance test deployment module 212, performance test execution module 214, and automated action generator 216. By way of illustration, step 220 includes discovering at least one addressable storage system (e.g., at a user environment) and current usage data related thereto. Step 222 includes obtaining user input (e.g., from one or more user devices) for at least one desired performance test, and processing such input, via performance test deployment module 212, in connection with one or more additional actions in deploying a test environment in step 224. For example, in one or more embodiments, deploying a test environment can include creating at least one test network, deploying at least one controller, creating at least one database on the at least one controller, deploying one or more workers and connecting the worker(s) to the controller(s), and setting-up data collection in connection with the controller(s). By way of example, FIG. 3 provides further details pertaining to a test controller and one or more workers. In creating at least one test network (e.g., a network that includes switches, cables, etc., and a logical entity), isolating test activity from other activities that may be running in a larger environment can include building an isolated logical network (e.g., a separate virtual local area network (VLAN)) and maintaining all of the test assets within it. In one or more embodiments, management software may have access to configure a network on the customer environment, facilitating creating a new logical network. If such management software does not have access to configure a network on the customer environment, a customer-defined network can be used. In either scenario, whatever is built in a test environment (e.g., via step 224 in FIG. 2) can be subsequently removed (as further detailed below in connection with step 238 in FIG. 2).

Subsequent to deploying the test environment in step 224, step 226 includes executing, via performance test execution module 214, the test. In at least one embodiment, such an execution step includes starting data collection, starting one or more defined workloads (e.g., defined based at least in part on the obtained user input), stopping the workload(s), and stopping data collection. One or more embodiments, as part of a test environment deployment step (e.g., step 224), can include configuring one or more parameters and/or elements in connection with reporting performance data to a controller, and starting such a process during executing. This can be configured, for example, in the <DataCollection> space illustrated in example code snippet 500 in FIG. 5.

Based at least in part on the executed test, results are displayed in step 228 and evaluated in step 230 via automated action generator 216. As also depicted in FIG. 2, based at least in part on the evaluation of the results in step 230, step 232 includes performing, via automated action generator 216, one or more troubleshooting tasks. Based at least in part on an outcome of the troubleshooting in step 232, step 234 includes remediating, also via automated action generator 216, one or more configuration aspects of the storage system(s) in question, and subsequently returning to step 226 to perform execution of the test again.

Additionally or alternatively, in one or more embodiments, step 236 includes storing and/or archiving at least a portion of the results. Further, step 238 includes deconstructing the test environment, and step 240 includes performing the system hand-off.

FIG. 3 shows components of an example performance test deployment module 312 in an illustrative embodiment. Specifically, FIG. 3 depicts a test controller 352, which can include and/or encompass a virtual machine (VM), on a system management cluster 350. Additionally, in at least one embodiment, the test controller 352 can initiate one or more performance tests, collect results from such tests, return the results to at least one user/caller, and collect system response data. FIG. 3 also depicts workers 362-1, 362-2, . . . 362-P (collectively referred to herein as workers 362) on a system production cluster 360.

By way merely of illustration, in at least one embodiment, a system production cluster 360 can include nodes (e.g., servers) that are user-facing, while a system management cluster 350 can include components that are reserved for internal use (e.g., by an enterprise). In such an embodiment, system production cluster 360 may include hundreds of nodes, while system management cluster 350 may include merely several nodes or other components. These resources are separately managed and used to hold administrative functions, provide troubleshooting, etc. In the example embodiment depicted in FIG. 3, workers 362 run on the nodes that will, post hand-off, contain the customer applications or other user applications, while test controller 352 runs in the same space as other management functions. The performance of the workers 362 is the proxy for the performance of the customer workload, while test controller 352 serves one or more management functions.

In one or more embodiments, such workers 362 can include hyper-converged nodes implemented as a VM, and/or storage-only nodes implemented as a user process. Additionally, such workers 362 can receive workloads and report individual results related thereto. As also illustrated in FIG. 3, the workers 362 connect to the test controller 352 via a private and/or temporary network.

In one or more embodiments, all VMs and processes (i.e., workers 362) are deployed by the controller 352, and cleaned-up and/or deconstructed (e.g., packages installed and removed) upon completion of the given workflow. Additionally, at least one embodiment includes enabling and/or facilitating a custom workload to be loaded via performance test deployment module 312. By way of example, such an embodiment can include using a network performance measurement and tuning tool (e.g., iPerf) to check intra-node bandwidth, as well as using a flexible input-output tester to test, for example, IOPS performance. Also, in such an example embodiment, the description of such a test can be versioned and tracked as a single file for ease of use.

FIG. 4 shows an example code snippet for implementing instructions to deploy a performance test in an illustrative embodiment. In this embodiment, example code snippet 400 is executed by or under the control of at least one processing system and/or device. For example, the example code snippet 400 may be viewed as comprising a portion of a software implementation of at least part of automated storage system performance validation system 105 of the FIG. 1 embodiment.

The example code snippet 400 illustrates steps for creating a new VLAN (in order to isolate a test), deploying a new test controller, and deploying new workers. In one or more embodiments, clean-up and/or removal operations may be contained and/or configured via a separate file and/or action. Also, in an example embodiment, a workflow such as depicted in FIG. 5 can become operable at this point (e.g., after the test controller and workers have been deployed). Referring again to FIG. 4, example code snippet 400 also illustrates steps for cleaning-up and/or removing the workers, as well as cleaning-up and/or removing the test controller(s), which can include archiving results.

By way of more specific example, code snippet 400 includes configuring a deploy test network, which can include a private network for test communication and can include hosts such as management hosts and systems under test. Additionally, such a deploy test network can include tasks such as creating a VLAN (e.g., with a unique test VLAN identifier). Also, code snippet 400 includes configuring a deploy test controller, which can include at least one database to which workers report, as well as a data collection mechanism. Such a deploy test controller can include hosts such as management hosts, and can also include tasks such as deploying a controller VM (e.g., associated with a given internet protocol (IP) address). Further, and as also illustrated in the example embodiment of FIG. 4, code snippet 400 includes configuring at least one deploy test worker, which includes a task of creating a test area for the given worker(s), configuring at least one clean-up test worker, which includes a task of identifying a clean-up test area for the worker(s) to operate, and configuring at least one clean-up test controller, which includes a task of archiving test results.

It is to be appreciated that this particular example code snippet shows just one example implementation of instructions to deploy a performance test, and alternative implementations of the process can be used in other embodiments.

FIG. 5 shows an example code snippet for implementing instructions to run a performance test on a given environment in an illustrative embodiment. In this embodiment, example code snippet 500 is executed by or under the control of at least one processing system and/or device. For example, the example code snippet 500 may be viewed as comprising a portion of a software implementation of at least part of automated storage system performance validation system 105 of the FIG. 1 embodiment.

The example code snippet 500 illustrates steps for data collection, which includes beginning a data collection process for multiple parts of storage system using a test definition. Such a process includes collecting data from users, which includes implementing at least one controller to monitor user experience. Additionally, such a process includes collecting data from the storage system, which includes monitoring one or more system responses.

By way of more specific example, code snippet 500 includes identifying data collection parameters for one or more given storage systems (e.g., identifying IOPS and bandwidth in the FIG. 5 example). Additionally, code snippet 500 includes configuring and executing the data collection process in connection with a specified performance test definition. In the example embodiment depicted in FIG. 5, the performance test definition includes running a series of input-output tests on given identified files, and running, in parallel, network bandwidth tests between given hosts.

Also, in one or more embodiments, such instructions to run a performance test on a given environment can comprise a workload which, for example, supports executables pre-installed in at least one VM image, uses test program command lines for flexibility, etc.

It is to be appreciated that this particular example code snippet shows just one example implementation of instructions to run a performance test on a given environment, and alternative implementations of the process can be used in other embodiments.

As detailed herein, one or more use cases implementing at least one embodiment can include performance testing upon initial installation of a storage system, which can drive confidence that the storage system and/or solution was deployed correctly prior to a hand-off. Additionally or alternatively, one or more use cases can also include monitoring and/or analyzing performance expectations, which can include determining whether a given deployed storage system is performing as well as expected with varying workloads. Further, such use cases can additionally or alternatively include testing the impact on storage system performance with respect to various feature and/or configuration changes.

At least one embodiment can be implemented, for example, in connection with hyper-converged infrastructure and/or two-layer design patterns. Additionally, such embodiments can be implemented for use in connection with a virtualized environment and/or a bare-metal environment.

As described herein, one or more embodiments include validating performance on a given storage system after the storage system is deployed in a customer environment or other user environment. Such an embodiment can also include tuning one or more performance tests for repeatability in order to deliver at least one baseline and/or benchmark for the user environment. In at least one embodiment, such performance tests can be deployed into a private network in order to minimize impact to one or more production networks. Additionally, one or more embodiments include performing intelligent monitoring of given storage system configurations to accurately scale a testing framework. Further, as detailed herein, at least one embodiment includes carrying out automatic clean-up of the environment after performance test results are evaluated in order to minimize upkeep and maintenance on the storage system.

Figure 6:
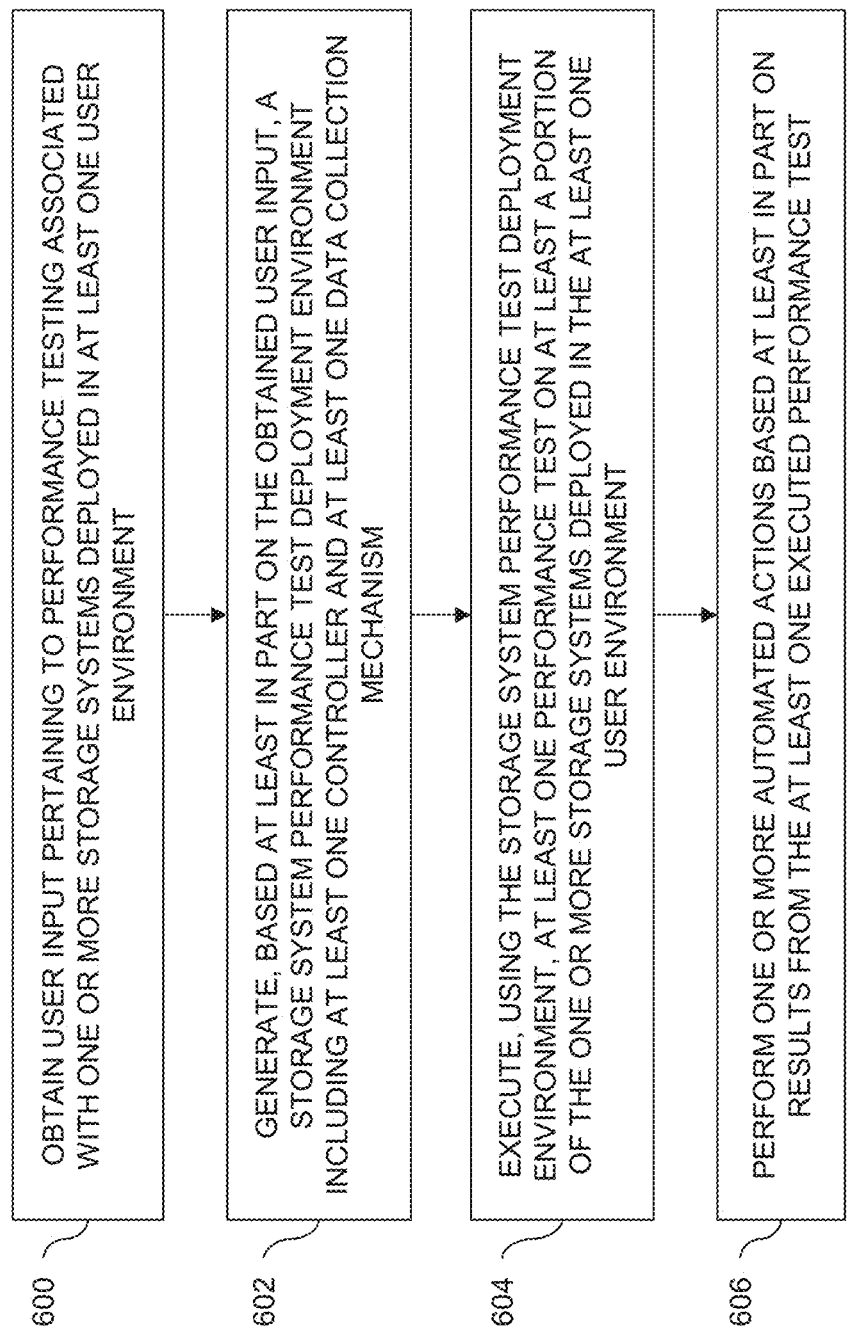
FIG. 6 is a flow diagram of a process for automated storage system performance validation in an illustrative embodiment.

FIG. 6 is a flow diagram of a process for automated storage system performance validation in an illustrative embodiment. It is to be understood that this particular process is only an example, and additional or alternative processes can be carried out in other embodiments.

In this embodiment, the process includes steps 600 through 606. These steps are assumed to be performed by the automated storage system performance validation system 105 utilizing its elements 112, 114 and 116.

Step 600 includes obtaining user input pertaining to performance testing associated with one or more storage systems deployed in at least one user environment. Step 602 includes generating, based at least in part on the obtained user input, a storage system performance test deployment environment including at least one controller and at least one data collection mechanism. In at least one embodiment, generating the storage system performance test deployment environment includes creating at least one test network, deploying the at least one controller within the at least one test network, creating at least one database in connection with the at least one controller, implementing one or more worker nodes and connecting the one or more worker nodes to the at least one controller, and configuring the at least one data collection mechanism in connection with the at least one controller. In such an embodiment, the one or more worker nodes can include one or more hyper-converged nodes implemented as one or more virtual machines. Additionally or alternatively, the one or more worker nodes can include one or more storage-only nodes implemented as at least one user-defined process.

Step 604 includes executing, using the storage system performance test deployment environment, at least one performance test on at least a portion of the one or more storage systems deployed in the at least one user environment. In one or more embodiments, the at least one performance test includes one or more workloads, defined based at least in part on the obtained user input, pertaining to measuring at least one expected level of performance given one or more constraints of the one or more storage systems.

Step 606 includes performing one or more automated actions based at least in part on results from the at least one executed performance test. In at least one embodiment, performing one or more automated actions includes performing one or more configuration modifications to at least a portion of the one or more storage systems. Additionally or alternatively, performing one or more automated actions can include removing the storage system performance test deployment environment from the at least one user environment. Further, in one or more embodiments, performing one or more automated actions can include modifying at least a portion of the at least one performance test, troubleshooting at least one aspect of performance of the one or more storage systems, and/or establishing one or more performance benchmark for use in monitoring one or more changes in storage system behavior.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically carry out user-defined performance testing on one or more storage systems in a user environment. These and other embodiments can effectively overcome problems associated with time-consuming, resource-intensive, and error-prone techniques.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
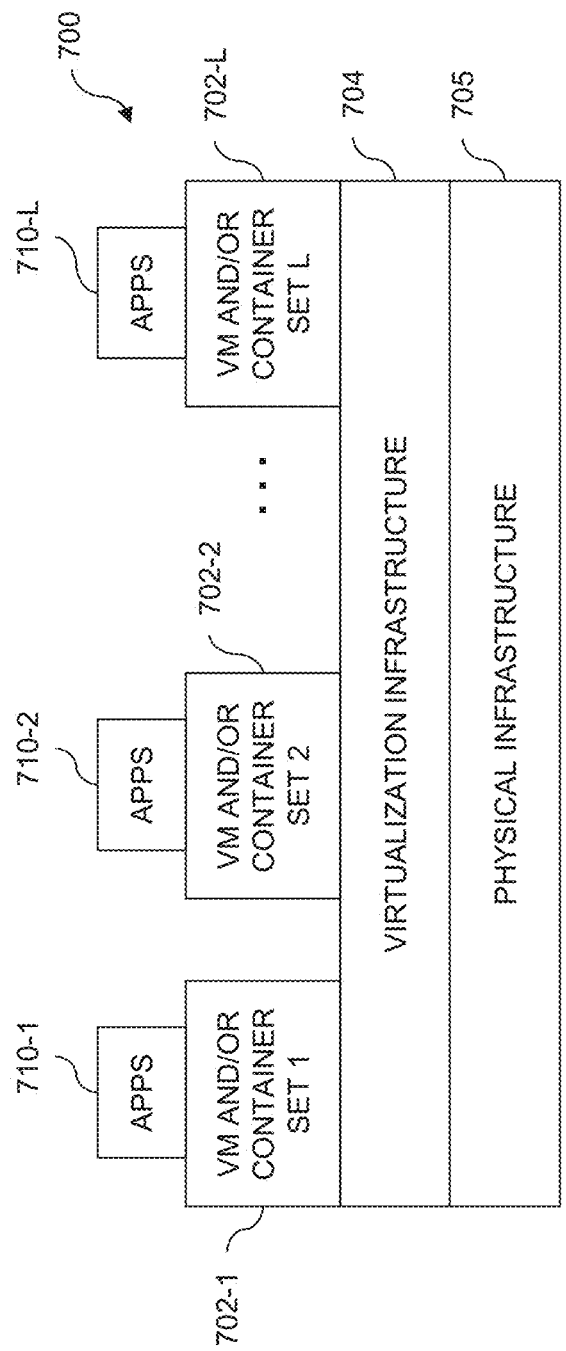
FIGS. 7 and 8 show examples of processing platforms that may be utilized to implement at least a portion of an information processing system in illustrative embodiments.
Figure 8:
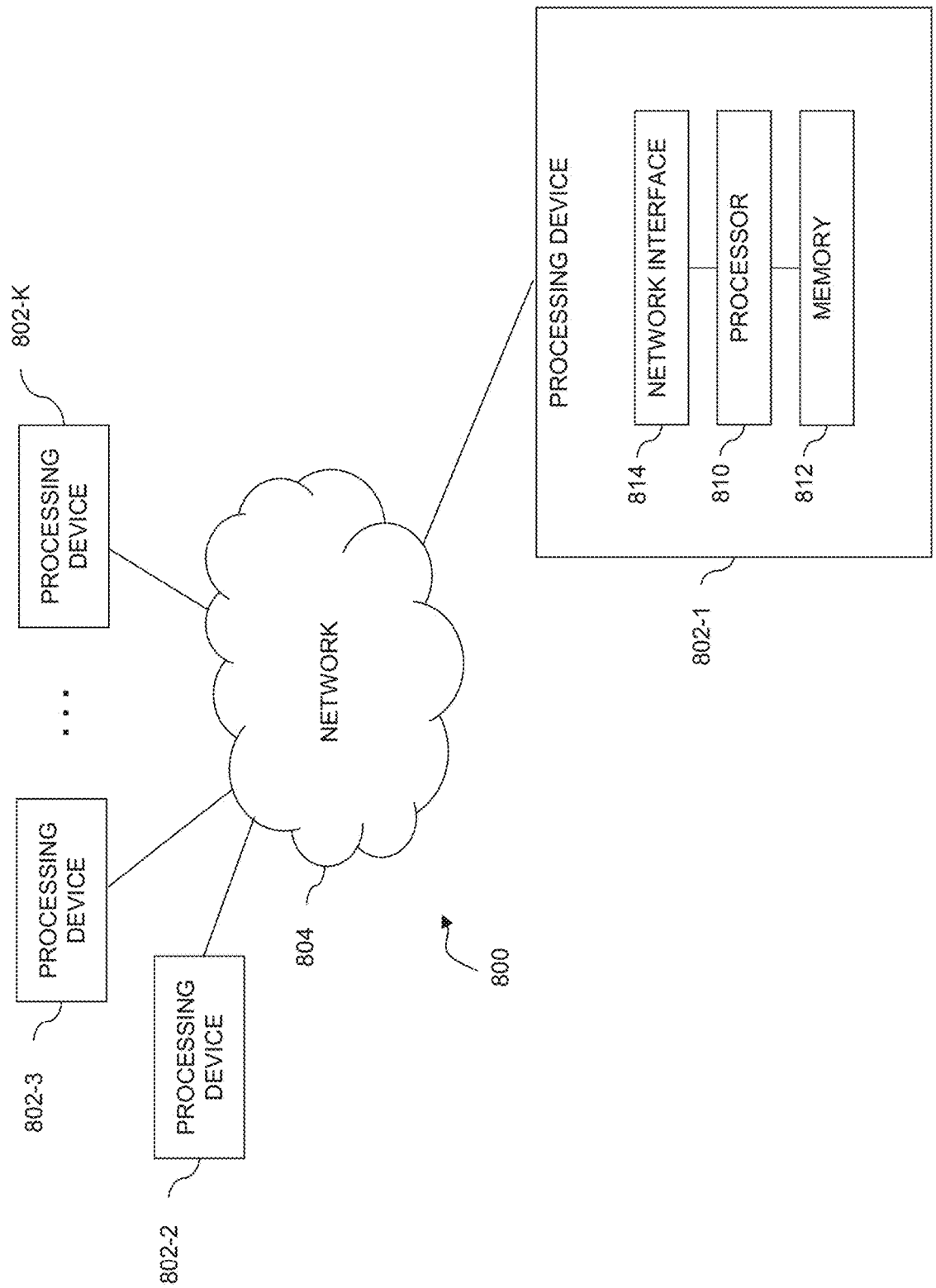

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple VMs and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, wherein the hypervisor platform has an associated virtual infrastructure management system. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an application-specific integrated circuit (ASIC), a field-programmable gate array (FPGA) or other type of processing circuitry, as well as portions or combinations of such circuitry elements.

The memory 812 comprises random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    obtaining user input pertaining to performance testing associated with one or more storage systems deployed in at least one user environment;
    generating, based at least in part on the obtained user input, a storage system performance test deployment environment comprising at least one controller and at least one data collection mechanism;
    executing, using the storage system performance test deployment environment, at least one performance test on at least a portion of the one or more storage systems deployed in the at least one user environment; and
    performing one or more automated actions based at least in part on results from the at least one executed performance test, wherein performing one or more automated actions comprises removing at least portions of the storage system performance test deployment environment from the at least one user environment subsequent to the at least one executed performance test;
    wherein the method is performed by at least one processing device comprising a processor coupled to a memory.

2. The computer-implemented method of claim 1, wherein generating the storage system performance test deployment environment comprises creating at least one test network, deploying the at least one controller within the at least one test network, creating at least one database in connection with the at least one controller, implementing one or more worker nodes and connecting the one or more worker nodes to the at least one controller, and configuring the at least one data collection mechanism in connection with the at least one controller.

3. The computer-implemented method of claim 2, wherein the one or more worker nodes comprise one or more hyper-converged nodes implemented as one or more virtual machines.

4. The computer-implemented method of claim 2, wherein the one or more worker nodes comprise one or more storage-only nodes implemented as at least one user-defined process.

5. The computer-implemented method of claim 1, wherein performing one or more automated actions comprises performing one or more configuration modifications to at least a portion of the one or more storage systems.

6. The computer-implemented method of claim 1, wherein the at least one performance test comprises one or more workloads, defined based at least in part on the obtained user input, pertaining to measuring at least one expected level of performance given one or more constraints of the one or more storage systems.

7. The computer-implemented method of claim 1, wherein performing one or more automated actions comprises modifying at least a portion of the at least one performance test.

8. The computer-implemented method of claim 1, wherein performing one or more automated actions comprises troubleshooting at least one aspect of performance of the one or more storage systems.

9. The computer-implemented method of claim 1, wherein performing one or more automated actions comprises establishing one or more performance benchmark for use in monitoring one or more changes in storage system behavior.

10. A non-transitory processor-readable storage medium having stored therein program code of one or more software programs, wherein the program code when executed by at least one processing device causes the at least one processing device:
    to obtain user input pertaining to performance testing associated with one or more storage systems deployed in at least one user environment;
    to generate, based at least in part on the obtained user input, a storage system performance test deployment environment comprising at least one controller and at least one data collection mechanism;
    to execute, using the storage system performance test deployment environment, at least one performance test on at least a portion of the one or more storage systems deployed in the at least one user environment; and
    to perform one or more automated actions based at least in part on results from the at least one executed performance test, wherein performing one or more automated actions comprises removing at least portions of the storage system performance test deployment environment from the at least one user environment subsequent to the at least one executed performance test.

11. The non-transitory processor-readable storage medium of claim 10, wherein generating the storage system performance test deployment environment comprises creating at least one test network, deploying the at least one controller within the at least one test network, creating at least one database in connection with the at least one controller, implementing one or more worker nodes and connecting the one or more worker nodes to the at least one controller, and configuring the at least one data collection mechanism in connection with the at least one controller.

12. The non-transitory processor-readable storage medium of claim 11, wherein the one or more worker nodes comprise at least one of one or more hyper-converged nodes implemented as one or more virtual machines, and one or more storage-only nodes implemented as at least one user-defined process.

13. The non-transitory processor-readable storage medium of claim 10, wherein performing one or more automated actions comprises performing one or more configuration modifications to at least a portion of the one or more storage systems.

14. An apparatus comprising:
    at least one processing device comprising a processor coupled to a memory;
    the at least one processing device being configured:

to obtain user input pertaining to performance testing associated with one or more storage systems deployed in at least one user environment;

to generate, based at least in part on the obtained user input, a storage system performance test deployment environment comprising at least one controller and at least one data collection mechanism;

to execute, using the storage system performance test deployment environment, at least one performance test on at least a portion of the one or more storage systems deployed in the at least one user environment; and to perform one or more automated actions based at least in part on results from the at least one executed performance test, wherein performing one or more automated actions comprises removing at least portions of the storage system performance test deployment environment from the at least one user environment subsequent to the at least one executed performance test.

15. The apparatus of claim 14, wherein generating the storage system performance test deployment environment comprises creating at least one test network, deploying the at least one controller within the at least one test network, creating at least one database in connection with the at least one controller, implementing one or more worker nodes and connecting the one or more worker nodes to the at least one controller, and configuring the at least one data collection mechanism in connection with the at least one controller.

16. The apparatus of claim 15, wherein the one or more worker nodes comprise at least one of one or more hyper-converged nodes implemented as one or more virtual machines, and one or more storage-only nodes implemented as at least one user-defined process.

17. The apparatus of claim 14, wherein performing one or more automated actions comprises performing one or more configuration modifications to at least a portion of the one or more storage systems.

18. The apparatus of claim 14, wherein performing one or more automated actions comprises modifying at least a portion of the at least one performance test.

19. The apparatus of claim 14, wherein performing one or more automated actions comprises troubleshooting at least one aspect of performance of the one or more storage systems.

20. The apparatus of claim 14, wherein performing one or more automated actions comprises establishing one or more performance benchmark for use in monitoring one or more changes in storage system behavior.

* * * * *